US012787048B2

(12) United States Patent
Portier

(10) Patent No.: US 12,787,048 B2
(45) **Date of Patent: *Nov. 3, 2026**

(54) TECHNIQUES FOR ROBUST PREAMBLE GENERATION FOR SCALABLE PACKETS IN LONG RANGE WIRELESS NETWORK

(71) Applicant: Silicon Laboratories Inc., Austin, TX (US)

(72) Inventor: Fabrice Christophe Olivier Portier, Thorigné (FR)

(73) Assignee: Silicon Laboratories Inc., Austin, TX (US)

( * ) Notice: Subject to any disclaimer, the term of this patent is extended or adjusted under 35 U.S.C. 154(b) by 378 days.

This patent is subject to a terminal disclaimer.

(21) Appl. No.: 18/390,199

(22) Filed: Dec. 20, 2023

(65) Prior Publication Data

US 2025/0008541 A1 Jan. 2, 2025

Related U.S. Application Data

(63) Continuation-in-part of application No. 18/342,975, filed on Jun. 28, 2023.

(51) Int. Cl.
*H04W 72/541* (2023.01)
*H04L 49/9057* (2022.01)
*H04L 69/22* (2022.01)
*H04W 74/08* (2009.01)

(52) U.S. Cl.
CPC ....... *H04W 72/541* (2023.01); *H04L 49/9057* (2013.01); *H04L 69/22* (2013.01); *H04W 74/0891* (2013.01)

(58) Field of Classification Search
CPC .... H04L 1/0033; H04L 1/0003; H04L 1/0007
USPC ......................................................... 370/328
See application file for complete search history.

(56) References Cited

U.S. PATENT DOCUMENTS 7,570,929 B1 * 8/2009 Trompower ........ H04W 52/286 455/114.3
7,661,038 B2 * 2/2010 Li .......................... H04B 17/24 714/704
7,839,845 B2 * 11/2010 Stephens ............... H04W 28/06 370/473
8,750,215 B2 * 6/2014 Azizi .................. H04L 27/2666 370/208
9,191,923 B2 * 11/2015 Taghavi Nasrabadi ...................... H04L 27/26132

(Continued)

FOREIGN PATENT DOCUMENTS

EP 1746756 B1 1/2013
JP 2007522686 A 8/2007

(Continued)

OTHER PUBLICATIONS

United States Patent Office, Non-Final Office Action dated Jul. 21, 2025 in U.S. Appl. No. 18/342,975 (15 pages).
United States Patent Office, Notice of Allowance dated Jan. 30, 2026 in U.S. Appl. No. 18/342,995 (26 pages).

(Continued)

*Primary Examiner* — Anthony Mejia
(74) *Attorney, Agent, or Firm* — Trop, Pruner & Hu, P.C.

(57) ABSTRACT

In one aspect, a circuit includes a preamble generator to generate a preamble having a first field and a second field, the first field having a first sequence that is repeated a plurality of times, a length of the first sequence and a number of the plurality of times based at least in part on a range between a transmitter and a receiver.

20 Claims, 6 Drawing Sheets

(56) References Cited

U.S. PATENT DOCUMENTS

| | | | | |
|---|---|---|---|---|
| 9,847,849 | B2 * | 12/2017 | Greenberg | H04L 1/0009 |
| 10,075,309 | B2 * | 9/2018 | Chen | H04L 1/0031 |
| 11,171,737 | B2 * | 11/2021 | Liu | H04L 1/18 |
| 11,638,291 | B2 * | 4/2023 | Fakoorian | H04L 1/0003<br>370/277 |
| 2004/0218522 | A1 * | 11/2004 | Sundstrom | H04L 1/0007<br>370/208 |
| 2005/0227645 | A1 * | 10/2005 | Sudo | H04W 52/52<br>455/127.2 |
| 2014/0141779 | A1 | 5/2014 | Yuk et al. | |
| 2016/0365952 | A1 | 12/2016 | Kim et al. | |
| 2017/0346579 | A1 * | 11/2017 | Barghi | H04B 17/21 |
| 2019/0109685 | A1 * | 4/2019 | Sanderovich | H04L 1/08 |
| 2019/0159000 | A1 * | 5/2019 | Ilami | G06Q 30/0251 |
| 2021/0314022 | A1 * | 10/2021 | Jang | H04B 1/71632 |
| 2023/0237422 | A1 * | 7/2023 | Trinelli | G06Q 10/0833<br>705/333 |
| 2025/0007643 | A1 | 1/2025 | Portier et al. | |
| 2025/0007756 | A1 * | 1/2025 | Portier | H04L 12/66 |
| 2025/0008541 | A1 * | 1/2025 | Portier | H04L 49/9057 |

FOREIGN PATENT DOCUMENTS

| | | | | |
|---|---|---|---|---|
| JP | 2015534353 | A | 11/2015 | |
| JP | 2016502821 | A | 1/2016 | |
| KR | 20090083365 | A | 8/2009 | |
| RU | 2433533 | C2 | 11/2011 | |
| RU | 2017114864 | A * | 11/2018 | H04L 1/0675 |
| WO | 2008068669 | A1 | 6/2008 | |
| WO | 2011145884 | A2 | 11/2011 | |
| WO | 2017034237 | A1 | 3/2017 | |
| WO | 2017034258 | A1 | 3/2017 | |
| WO | 2022054628 | A1 | 3/2022 | |

OTHER PUBLICATIONS

United States Patent Office, Reply to Office Action filed Feb. 19, 2026 in U.S. Appl. No. 18/342,975 (10 pages).

United States Patent Office, Non-Final Office Action dated Nov. 19, 2025 in U.S. Appl. No. 18/342,975 (28 pages).

CS 168 Textbook, ALL https://textbook.cs.168.io/intro/headers.html (Year: 2025).

United States Patent Office, Reply to Office Action filed Oct. 31, 2025 in U.S. Appl. No. 18/342,995 (9 pages).

United States Patent Office, Non-Final Office Action dated Aug. 12, 2025 in U.S. Appl. No. 18/342,995 (14 pages).

United States Patent Office, Reply to Office Action filed Oct. 20, 2025 in U.S. Appl. No. 18/342,975 (8 pages).

United States Patent Office, Response to Office Action filed Jun. 10, 2026 in U.S. Appl. No. 18/342,975 (10 pages).

U.S. Appl. No. 19/633,179, filed Mar. 30, 2026, entitled "Error Mitigation Techniques in a Wireless System," by Fabrice Christophe Olivier Portier.

United States Patent Office, Office Action dated Mar. 11, 2026 in U.S. Appl. No. 18/342,975 (28 pages).

F. Portier, U.S. Appl. No. 18/193,667, filed Mar. 31, 2023, entitled "Techniques for Robust Wide Area Modulation," 54 pgs.

F. Portier, U.S. Appl. No. 18/193,668, filed Mar. 31, 2023, entitled "Techniques for Reception of Scalable Sweep Wide Area Modulation Communications," 55 pgs.

D. C. Chu, "Polyphase Codes With Good Periodic Correlation Properties", IEEE Trans. on Inf. Theory, Jul. 1972, pp. 531-532.

U.S. Appl. No. 18/342,995, filed Jun. 28, 2023, by Fabrice Christophe Olivier Portier, entitled Error Mitigation Techniques in a Wireless System, 90 pgs.

U.S. Appl. No. 18/342,875, filed Jun. 28, 2023, by Fabrice Christophe Olivier Portier, entitled Scalable Packet Communication in a Long Range Wireless System, 72 pgs.

United States Patent Office, Notice of Allowance dated Jul. 7, 2026 in U.S. Appl. No. 18/342,975 (25 pages).

* cited by examiner

TECHNIQUES FOR ROBUST PREAMBLE GENERATION FOR SCALABLE PACKETS IN LONG RANGE WIRELESS NETWORK

CROSS-REFERENCE TO RELATED APPLICATION

The present application is a continuation-in-part of U.S. patent application Ser. No. 18/342,975, filed on Jun. 28, 2023, the content of which is hereby incorporated by reference.

BACKGROUND

In Long-Range wireless systems, especially with low-power 'random-access' transceivers (that do not have to be always perfectly synchronized nor consider slotted-access standards), the way to exchange packets of information is crucial and require well-designed signal preambles. These preambles allow the expected receivers to initiate a detection validation and synchronization process, to further demodulate and decode the packet information if (and preferably only if) it was targeting this receiver (with enough reliability). Several compromises must be considered, especially to be robust in license-free bands, while respecting the related regulations and maximal "energy density" constraints. Many current systems are not suitably scalable, and are implemented with tradeoffs or worst-case design settings that can increase complexity and power consumption, and waste resources. As a result, these tradeoffs reduce global wireless network performance in real environments.

SUMMARY OF INVENTION

In one aspect, an apparatus includes: a circuit to generate a packet having a preamble and at least one of a header or a data portion, wherein the preamble comprises a first field and a second field, the first field comprising a first sequence that is repeated a plurality of times, a length of the first sequence and a number of the plurality of times based at least in part on a range between the apparatus and a receiver; and a radio frequency (RF) front end circuit coupled to the circuit to process and transmit the packet.

In an implementation, the apparatus further comprises a controller coupled to the circuit, wherein the controller is to determine parameters of the preamble, the parameters comprising the length of the first sequence and the number of the plurality of times based at least in part on a range parameter and a group parameter to identify a network having the apparatus and the receiver.

In an implementation, the controller is to pre-negotiate at least the first sequence with the receiver. The circuit is to generate the preamble having the first sequence with a full slope over a bandwidth of the preamble, to enable continuity in phase and discrete-time frequency blocks once sampled at a given bandwidth frequency at the receiver, the receiver comprising an unsynchronized receiver to perform a correlation between the first field and an expected sequence corresponding to the first sequence.

In an implementation, the circuit is to generate the preamble having the second field comprising a second sequence that is repeated a second plurality of times. The circuit is to perform, on the second sequence for some of the second plurality of times, at least one operation according to a Recipe of operations. The circuit is to perform, on the second sequence for the some of the second plurality of times, the at least one operation according to the Recipe of operations comprising one or more of: a phase shift operation; a frequency shift; a conjugate operation; a time reversal; or a slope operation. The circuit is to generate the first sequence having a value and a bandwidth based at least in part on the range and a subpart of a group parameter, the group parameter subpart to identify at least one of a network or service having the apparatus and the receiver, to enable packet detection and mitigate interference and reduce false alarms.

In an implementation, the circuit is to generate the preamble comprising a third field having a third sequence that is repeated a third plurality of times, the circuit to perform, on the third sequence for at least some of the third plurality of times, at least one operation according to a Recipe of operations, wherein the third sequence is to enable further packet validation, enable a non-targeted receiver to filter the packet, and enable synchronization to retrieve time and frequency accurate estimations and alignment with the transmitter.

In an implementation, the apparatus further comprises at least one memory to store a table, the table comprising a plurality of sequences from which the first sequence is to be selected. The circuit may generate the preamble having a first bandwidth, the first bandwidth less than a bandwidth of the header and the data portion.

In another aspect, a method comprises: determining, in a controller of a transmitter, a first sequence and a second sequence for a preamble of a packet, based at least in part on a range between the transmitter and a receiver and a group identifier known at the transmitter and the receiver in a network comprising the transmitter and the receiver; forming a first portion of the preamble comprising a first plurality of repetitions of the first sequence; forming a second portion of the preamble comprising a second plurality of repetitions of the second sequence, comprising performing, on one or more of the second plurality of repetitions of the second sequence, a plurality of operations according to a Recipe of operations; and transmitting, from the transmitter, a RF signal comprising a packet comprising the preamble.

In an implementation, the method further comprises: when the range is less than a first distance, forming the first portion of the preamble comprising a first number of the first plurality of repetitions, the first sequence having a first length; and when the range exceeds the first distance, forming the first portion of the preamble comprising at least one of: a second number of the first plurality of repetitions, the second number greater than the first number; and the first sequence having a second length greater than the first length.

In an implementation, the method further comprises: forming the first portion of the preamble comprising the first plurality of repetitions of the first sequence, each of the first plurality of repetitions having a first slope; and forming the second portion of the preamble comprising the second plurality of repetitions of the second sequence, each of the second plurality of repetitions having a second slope, the second slope different than the first slope.

In another aspect, a system includes a transceiver comprising: a preamble generator to generate a preamble for a packet comprising the preamble, a header and a data portion, the preamble comprising: a first field comprising a first sequence that is repeated a first plurality of times, wherein: a first length of the first sequence and a number of the first plurality of times are based on a range parameter associated with a range capability between the system and a receiver; and the first sequence comprises a first slope and a first bandwidth dependent at least in part on a group parameter of a network comprising the system and the receiver; and a second field comprising a second sequence that is repeated a second plurality of times to provide phase continuity, wherein: the second sequence comprises a second slope, the preamble generator to apply a Recipe of operations to at least some of the second plurality of times of the second sequence, the Recipe of operations dependent at least in part on the group parameter. The transceiver also includes a RF front end circuit to form a RF signal comprising the preamble, the header and the data portion, the RF front end circuit to transmit the RF signal. The system also includes a non-volatile memory to store at least the first sequence.

In one implementation, the preamble generator is to generate: the first field comprising the first sequence comprising a first linear sweep that is repeated the first plurality of times; and the second field comprising the second sequence comprising a second linear sweep that is repeated the second plurality of times to provide phase and frequency continuity.

In another implementation, the preamble generator is to generate: the first field comprising the first sequence comprising a first linear sweep that is repeated the first plurality of times, the preamble generator to apply a first Recipe of operations to at least some of the first plurality of times of the first sequence to provide phase and frequency continuity; and the second field comprising the second sequence comprising a second linear sweep that is repeated the second plurality of times to provide phase and frequency continuity, wherein at least the second field is to enable multi-user and interference scaling and mitigation.

DETAILED DESCRIPTION

Figure 1:
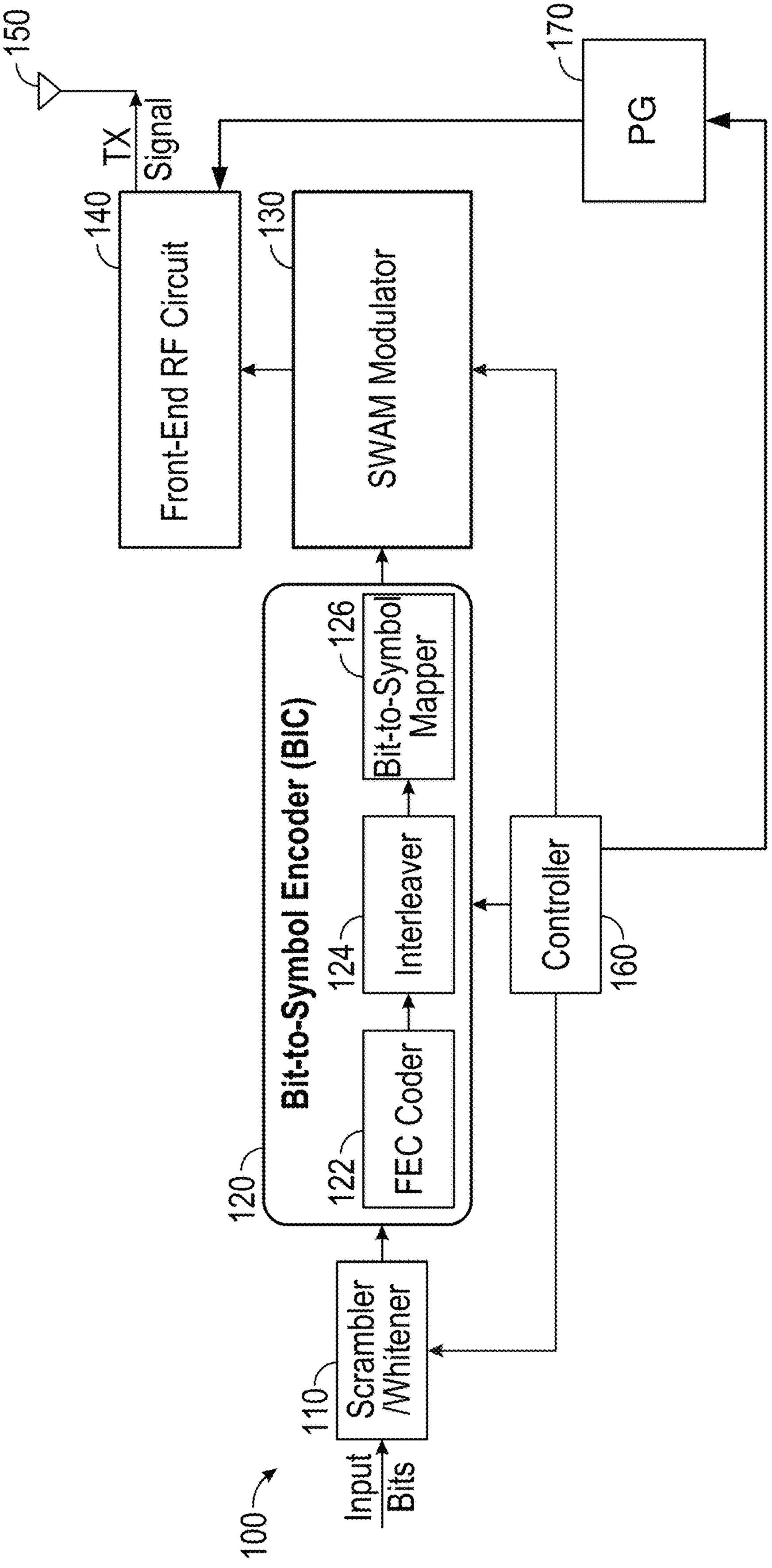
FIG. 1 is a block diagram of a transmitter in accordance with an embodiment.

In various embodiments, a preamble framework is provided for use in wireless systems having elegant solutions that are scalable enough to answer most of the needs of nowadays long-range networks. Preambles in accordance with embodiments are efficient (e.g., lowest-power, shortest packet), robust and low-cost (enabling rather simple receiver processing regarding the robustness with existing impairments and interferences). In embodiments, the available resource may be cautiously used with a limited and good spread of energy over the allocated bandwidth and duration for network users. In one or more implementations, for efficient low-cost low-power transceivers, packets have a reasonable bandwidth and limited power variation over time, i.e., low Peak-to-Average-Power-Ratio (PAPR), and provide solutions to be easily detected/synchronized/demodulated, even at low Signal-to-Interference-plus-Noise-Ratio (SINR) for a wide range of scenarios. With embodiments, reduced duration and latency can also help network management and efficiency. Optimizations and balance of preambles as described herein can target efficient low-power long-range, and reduce resource usage/pollution for next-generation scalable standards.

In various embodiments, preamble generation as described herein may be performed by a transmitter that is configured to send signals and perform modulation of information for long-range scenarios. Although embodiments are not limited in this regard, as an example a transmitter can be configured to dynamically control modulation aspects to enable transmission of wireless signals over relatively long ranges, e.g., of up to approximately a few tens or hundreds of kilometers.

Embodiments herein are specifically focused on such dynamic control of a preamble of a packet communication. This preamble is agnostic to modulation scheme. And further note that constraints on a waveform may not be the same for header and data as for the preamble. However, an example modulation scheme for header and/or data portions is first described to set an example context for the preamble formatting described herein. Understand that this preamble formatting can be used for packets having many different types of modulation schemes for header and data portions.

In embodiments, Constant Amplitude, and in particular Constant Amplitude Zero Auto-Correlation (CAZAC), sequences may be used as signal elements to be transmitted. In general, a CAZAC sequence is a polyphase sequence having periodic complex-valued signals with a modulus of one and out-of-phase periodic (cyclic) auto-correlations equal to zero. In an embodiment, an example for construction of such signal sequences may be a combination of well-chosen quasi-CAZAC sequences and Orthogonal Frequency Division Multiplexing (OFDM) principles. The chosen CAZAC sequences may be close to Zadoff-Chu (ZC) sequences, or more generally Generalized Chirp Sequences (GCS). Such a GCS-precoded or ZC-precoded OFDM signal can be used as a basis to define a modulation scheme robust for long-range scenarios. These sequences may optionally be transformed into another domain, e.g., using Fourier Transforms (Discrete Fourier Transform (DFT) or Fast Fourier Transform (FFT) processing) of OFDM systems, with potential further signal processing to shape the signal (e.g., windowing, filtering, power compression), to provide desired properties. Such sequences are referred to herein as Sweep-Sequences (SS), or more generally "sequences" and may be formed of tens to thousands of complex-valued samples.

A Generalized Chirp sequence (GCS) of complex samples, of length $N_{zc}$ and parameters (P,Q,U,S), could be defined with the following equation:

$$S_{GCS(Nzc,P,Q,U,S)}[n] = \exp\left(j\left(P + \frac{2\pi}{N_{zc}}\frac{Q}{2}n + \frac{2\pi}{N_{zc}}\frac{U}{2}n^2 + \frac{2\pi}{N_{zc}}\frac{S}{2}n^3\right)\right),$$

$$0 \le n \le Nzc - 1$$

where P, Q, U, S do not need to be integers.

As a subset, a root Zadoff-Chu sequence of complex samples, of length $N_{zc}$ and root u, with potential cyclic shift q is defined with the following equation:

$$S_{zc(Nzc,u)}[n] = \exp(-j \cdot \pi \cdot n \cdot (u(n+c) + 2q)/N_{zc}),$$
$$0 \le n < N_{zc},$$

where c is generally 0 for even $N_{zc}$ and 1 for default odd $N_{zc}$ (ensures cyclicity/continuity if repeated); u is an integer identifying the ZC sequence, called a root index. ZC is a particular case of GCS with S=0, P=0, integer u=–U, q=–Q/2 when $N_{zc}$ is even, and q=–(Q/2+U/2) when $N_{zc}$ is odd.

These ZC are polyphase sequences with perfect periodic auto-correlation function (i.e., complex sequences with unit amplitude and null auto-correlation for all cyclic shifts except zero). However, compromises considering pool of sequences with low shifted auto-correlation and low inter-correlations could be sufficient for a given application on subsequent parts of the packet.

OFDM (I) DFT conversion for $N_f$ complex samples is in accordance with the following equation:

$$X[k] = \frac{1}{\sqrt{N_f}} \sum_{n=0}^{N_f-1} x[n] \cdot \exp(\pm j \cdot 2\pi \cdot n \cdot k / N_f),$$
$$0 \le k \le Nf - 1.$$

DFT (or FFT) processing ensures signal continuity at sequence edges, and also allows resampling (final SS bandwidth can differ from initial/sampling bandwidth, filling edge FFT bins with zeros, e.g., when Nf>Nzc).

ZC-OFDM is the combination of these two processing functions, with potential intermediate- and/or post-processing to shape the signal (e.g., centering, filtering, windowing, shifting, compressing in power). After the selection of sizes ($N_{zc}$, $N_{fft}$=$N_f$.L) and sampling rates (that also define the SS bandwidth and duration), there can be several imaginable sequences that are quasi-orthogonal (up to Nzc for ZC-OFDM with integer u). Note that sequences can be L-oversampled to further improve the signal shaping and properties (e.g., finer tuning/filtering and management of PAPR/Out of Band (OoB) using higher FFT of length $N_{fft}$=$N_f$L instead of $N_{fft}$=$N_f$≥$N_{zc}$).

As another subset of GCS with U=0 and S=0, ultra-narrow-band simple carriers (constant frequency per block) sequences or hopping single-carrier sequences are also particular cases with low PAPR and some capabilities to provide several orthogonal sequences (or semi-orthogonal once different coding/hopping and/or Recipe of operations are applied for each user), e.g., for different values of even Q in [0, . . . . $N_{zc}$] in the GCS equation above. Piecewise-non-sweeping ultra-narrow-band sequences may appear less robust, for a given SS, than the presented CAZAC sequences regarding some noises and interferences, but robustness and good use of the allocated spectrum can be recovered from the Recipes described later in this document. Then, hopping subcarriers (piecewise pure sinusoids) to design a list of sequences is also a low-rate solution to share a scarce resource, and is equivalent to precoded-OFDM with the precoding vector of size Not being all zeros except one element at once (1 complex value on the unit circle). However, a general receiver for that case may need different algorithms with potential higher complexity to demodulate or synchronize (especially in real multipath or fast-fading channels, with spurs), just as less optimal spectrum (and potential dependency on filtering processes) compared to ZC and ZC-OFDM sequences. Moreover, presenting a different spread of energy over time, depending on the considered averaging periods to compute the spectrums, solutions that are more 'peaky in frequency' could be more restricted in power by regulations to access some wireless channels/bands.

As another intermediate example list of sequences, a subset of GCS with low sweeping slopes (non-integer 0<|U|<1 and/or more zeros on edges in a following OFDM FFT) and S=0, can provide sweeping sequences with low PAPR and capabilities to provide several orthogonal sequences (or weakly correlated) with another balance on robustness to interferences in time/frequency, number of simultaneous packets on the same band, and management of Groups. The related spectrum per SS does not spread the energy as equally as GCS/ZC-based sequences with integer U≥1, but the description of Recipes in next processing stages will allow to further spread properly the signal over the system bandwidth, while still allowing simplified receiver processing of sweeping sequences in real channels (with multipath interference). Simple receivers with robustness to any noise, including localized interferers 'peaky-in-frequency' and 'peaky-in-time', are possible with weighted aggregation of such blocks from the modulation. Then, from presented equations and solutions, users in the field can readily adjust parameters and durations to meet the requirements and regulations. Such low-slope high-localized-power may be used for a second part of a preamble to validate packet signature among several solutions and define specific but well-designed signals (e.g., continuous, good shaping in time and frequency with very low PAPR and limited bandwidth), also allowing efficient and precise synchronization refinement over the preamble.

In one or more embodiments, a transmitter may generate and/or store a pool of such sequences. These sequences may be particularly optimized for long range wireless communications, with particular properties including the following. The sequences may enable good shapes in time and frequency that are better than generic (worst-case) OFDM, having low power variations over time (low PAPR), and good shaping in frequency (aiming ideal spectrum for the application, with low Out-of-Band emissions), as presented above. These sequences may further have good auto-correlation and cross-correlations figures, e.g., localized circular auto-correlation (almost null except for zero-shift auto-correlation).

In general for the preamble part, the sequence provides a way to easily detect a packet signature (mainly defined by a slope and bandwidth in the first part of the preamble) and synchronize the receiver in time and frequency. In one or more embodiments, preamble waveforms may be configured to be well-shaped (low power variations i.e., PAPR close to 0 dB, and low OoB emission i.e., a good spectrum mask) and allow a receiver to easily detect and synchronize. To this end, embodiments provide preambles that avoid discontinuities at block edges when concatenating sequences, and have well-chosen variations over the preamble (phase/frequency/slope).

Note that sweep-sequences with different slopes can provide reasonable distinction (as soon as slopes are sufficiently apart, e.g., >5% difference in blocks of ~100 samples) to allow packet detection/identification among others if needed to increase the multiple-access capabilities in large networks.

Several properties like symmetries/repetitions can exist among sequences (e.g., the conjugate of a sequence is generally its reversed-ordered version when sequences are anti-symmetric, generally representing a frequency sweep in the other direction and $u'=N_{zc}-u$) and could also save memory. These sequences are often close to frequency-sweep sequences (CSS could be seen as a particular case of ZC-OFDM with the simplest sweep over the full $N_{zc}=N_{fft}$, with u=1 and without windowing), i.e., could approach one or several tones sweeping (less than one, one or several times) on the allocated area (given bandwidth and sequence duration).

Using such a SS as a basis, a Symbol Modulated and Extended (SME) can be generated to efficiently transmit information. SME is the combination of a modulation of the SS and an extension of that signal that is repeated (e.g., 4 modulated SSI repetitions). In addition, each of these extended SS's may have one or more operations (from Recipe) performed on it, as described further below.

Note that in one embodiment, the same SS is used for the repetitions in the given SME (even if a potentially different operation is performed on each repeated SS inside the SME). In an embodiment to simplify, a limited set of operations inside a SME may be used. For example, in one implementation, these operations may include: conjugate operator and/or time reversal, i.e., SS'(n)=conj(SS(n)) or SS'(n)=SS N−n), n=0, . . . . N−1; phase operations (e.g., extended generic case of +/−{1,j}), i.e., SS'(n)=exp(j.θ).SS(n); frequency shifts (e.g., from a numerically controlled oscillator (NCO)), i.e., SS'(n)=SS(n)·exp(j.2π.δ.n/N) with typically |δ|≤1 if the small/fractional frequency shift is mainly used to improve signal continuity at edges or spectrum use, or any larger δ if frequency shifts are also used to manage interference-mitigation; and/or a combination of any of all these operations.

Note that SME extension is presented as a repetition of an integer number of SS to simplify description, but could also be slightly extended, similarly to OFDM Cyclic Prefixes, to better manage SME edges in real channels with echoes. As an example, instead of a cyclic extension of 3 times the SS, to have 4 cyclic repetitions of the SS, there can be 4.25 cyclic repetitions of the SS (to have a quarter symbol to smooth the signal and minimize inter-symbol interferences when there are echoes and filtering).

Note that in embodiments, SS inversion (minus) and pi/2-rotation (j) are particular cases of the phase operator, and conjugation is generally a particular case of time-reversal (sequence played in the other direction, when sequences depict symmetries) with a potential frequency-shift.

Embodiments implementing Sweep Wide-Area Modulation (SWAM) can be seen as a modulation technique for an entire packet or one or more portions of a packet (e.g., a data portion). Depending on implementation, such precoded-OFDM modulations may be included as an extra mode or "modulation and coding scheme" (MCS) of a Wireless-Smart Ubiquitous Network (SUN-OFDM), or as a building block of a new and optimized system/standard, more flexible, and superset of a Large-Scale Low-Rate Network (like IEEE 802.15.4g WiSUN).

Referring now to FIG. 1, shown is a block diagram of a transmitter in accordance with an embodiment. More specifically, as shown in FIG. 1 transmitter 100 is configured to transmit packets according to a communication protocol in accordance with an embodiment. In the view of FIG. 1, all components (except for an antenna 150) may be implemented on one or more dies of an integrated circuit (IC). In some cases, all of the circuitry may be implemented on a single semiconductor die, while in other cases multiple dies may be present within an IC package. Transmitter 100 may be configured to send preambles and then leverage each information-bit (for reliability) at antenna 150 over a dedicated block, adapted to the selected modulation order and coding scheme.

As shown, incoming information in the form of an input bit stream (which may be generated within digital circuitry of the transmitter or a device coupled to the transmitter) are input into a scrambler 110. In various embodiments, scrambler 110 (which can be optional in some embodiments) may scramble and/or whiten the incoming bits, which are then provided to a bit-to-symbol encoder (generally encoder 120). In the high-level view of FIG. 1, encoder 120 is shown with constituent components, including an encoder 122, an interleaver 124, and a mapper 126. Encoder 122 is configured to perform FEC coding on the incoming bits. In turn the encoded bits are provided to an optional interleaver 124, which may interleave the incoming bits in accordance with a given interleaving scheme. The interleaved bits are then provided to mapper 126, which performs optional reordering and bit-to-symbol mapping to thus output a corresponding symbol from one or more of the incoming bits. Note a well-chosen block FEC could do all-in-one 'smart bit-to-symbol' encoding and mapping (especially for small blocks like headers), removing the need for extra interleavers and remappers/reordering.

Still with reference to FIG. 1, the symbols are provided to a SWAM modulator 130. As will be described herein, SWAM modulator 130 may perform a modulation of incoming symbols using a SS sequence. In addition, the modulated symbol may be extended, with the symbol repeated, e.g., copied one or more times. Then additional processing may be performed on each of these symbol copies, namely, a so-called Recipe of operations. Thereafter, optional signal shaping may be performed.

A resulting series of blocks of samples (for preamble or modulated and extended symbols (SMEs)), optionally shaped/filtered/smoothed, is provided to a radio frequency (RF) front end circuit 140. Various digital and analog processing may be performed, including upconversion to RF level, filtering, gain control and amplification (including in a power amplifier of RF front end circuit 140), to result in a transmit RF signal that is transmitted via antenna 150.

Still with reference to FIG. 1, a controller 160 is present. In various embodiments, controller 160 is configured to control the constituent components of transmitter 100. In particular embodiments, controller 160 may be a programmable hardware circuit that is configured to execute instructions such as may be stored in one or more non-transitory storage media.

In embodiments, controller 160 may, based at least in part on input parameters and/or symbol index, determine an appropriate SS to be used for modulation, and determine an appropriate Recipe of operations to be performed on the SS. Still further, controller 160 may be configured to control any optional signal shaping performed in SWAM modulator 130.

While the above discussion relates to a specific modulation scheme for header and/or data portions, understand that the techniques described herein that focus on a preamble can be used with many other types of modulation schemes.

Still with reference to FIG. 1, transmitter 100 also includes a preamble generator 170. In embodiments, preamble generator 170, under control of controller 160, is configured to generate a preamble having multiple portions, each formed of a dynamically determined signal (but generally pre-known by the expected/targeted receiver), each of a determined length. Further, one or more operations (determined by controller 160 as a Recipe of operations) can be performed on the sequences of at least one portion.

In an exemplary embodiment, the preamble is formed of at least two portions. A first part (called STF0) is composed of L0 repetitions of a sequence S0, and a second part (called STF1) is composed of L1 repetitions of another sequence S1. This second portion may be formed with potential operations on one or more of the repetitions. These operations may be obtained from a pool of operations, as defined by a Recipe vector.

Controller 160 may cause preamble generator 170 to generate this preamble having a waveform as "nice" as possible (in terms of continuity/shaping as there is no non-deterministic information to be modulated and transmitted). That is, controller 160 can precompute a deterministic waveform to be expected by a receiver. This control enables low-power operation for both transmit (TX) and receive (RX) devices. The TX sends packets including a preamble that is sent consuming low power (as it is a generally constant-power or almost constant-power) with low-complexity signal, and the RX can detect an expected packet preamble in a noisy environment (where there are multiple devices and channel interference in addition to usual impairments) and properly synchronize and correct mismatches between TX and RX (e.g., time and frequency errors/offsets). Although shown at this high level in the embodiment of FIG. 1, many variations and alternatives are possible.

Embodiments enable early identification of a packet and interference mitigation, providing advantages in a global multi-user system. Continuing with the above discussion of a preamble, all sequences/repetitions have the same block duration (known at both sides, transmitter and receiver), allowing a simple block processing with two levels of diversity recovery at the receiver. This block processing at the receiver includes a first recovery operation, e.g., through a tractable in length (N) correlation/fast Fourier transform (FFT) and analysis with expected sequences, and a second recovery operation via a smart/weighted combination of the analysis results to further increase robustness in harsh channels and environments.

In some embodiments, at least the end of the second portion (STF1) can contain optional Recipe operations that do not change the default basic analysis in modulus, but can help in reducing interference among similar packets, provide extra information to further improve performance, and allow early packet filtering if this packet is not targeted to a particular receiver. This early filtering may especially be realized using frequency variations, signal complex-conjugation (=sweep in the other direction) and even optional phase operation once the receiver is sufficiently synchronized.

In some embodiments, a preamble may include an optional third portion (also referred to as "STF2"). This additional preamble field may be based on a sequence S2 (that can be equivalent to S0 and/or S1) with a dedicated recipe operator vector to further improve performance and distinguish this packet among other signals, and early filter/select the remaining processing at receivers.

With embodiments, a transmitter may generate a preamble that simplifies operation both for a TX and a RX, enabling use in low-cost low-power long-range integrated circuits (ICs). In addition, this preamble is not sensitive to usual signals and impairments (usual noises, DC, peaky noises, narrow-band interferences and spurs, channel fadings, pulses, or so forth).

This preamble may present ideal shaping in time/frequency (adapted to RF constraints, including low power variations in time, i.e., limited PAPR, and good spectrum localization in frequency), customizable, just as the global spectrum/duration and number of repeated blocks to target the required sensitivity, using adequate recipes to further extend identification and interference mitigation capabilities, without necessarily increasing receiver complexity (scalable).

Particular embodiments comply with IEEE 802.15.4 framework/regulations, and can be considered as an orthogonal frequency division multiplexing (OFDM)-based solution. In addition, the preamble is future-proof (e.g., can extend identification/group capabilities while still properly spreading the energy over the allocated spectrum and duration, providing another multiple-access dimension with sequence-slopes and recipes).

This preamble can be seen as a series of linear-precoded OFDM symbols without cyclic-prefix. Existing transmitters may be dynamically updated with firmware and/or software to generate packets having preambles (and remaining packet portions) as described herein.

Progressive improvement of detection validation and recovery of synchronization are keys to realize good performance while keeping packet length as short as possible for a given range profile/target, to achieve power efficiency, network system efficiency and reasonable packet interference mitigation.

In embodiments, recipes are based on one or more of the following (non-exclusive) operator list that can be applied on each sequence/block repetition (assuming complex vectors of samples to digitally describe signal sequences): (1) signal phase operation (including inversion or complex rotation, i.e., multiply by ±1 or ±j); (2) signal conjugation (i.e., inversing the imaginary part); (3) signal time-reversal (playing the signal vector in the other direction); and (4) signal frequency-shift operation (via a numerically controlled oscillator (NCO), i.e., multiplying by $\exp(\pm j.\pi.d.n/N)$, on the $n=[0, \ldots N-1]$ samples). Of course other operations may be performed in other embodiments. For example, slope could be a parameter of the Recipe operations (like the frequency shift, and in such cases can be an additional order frequency variation shift parameter; However, even if efficient for robustness and mentioned targets/objectives, it could be generally more complex for a receiver, given additional correlations (with different slopes over time) to perform).

Beginning with the first preamble portion (STF0), a sequence S0 is used that may have an integer slope V0 (where the slope V is defined as the number of frequency sweeps over a given block duration N, considering a linear sweep). Ideally, one full sweep may be performed over the whole defined bandwidth (BW) (V0=1), and simple repetitions of this sequence occur. This allows simple RX processing for efficient detection in asynchronous cases (unslotted/random access, and equivalent detection whatever the timeshift is).

Next the second preamble portion (STF1) is formed of a sequence S1 having a different default slope from S0. In one example, this different default slope can be a simple inversed slope by using a conjugate operation. Of course, many other options are possible (including $V1=\pm P/Q$ like $\pm 1/2$, $\pm 1/4$, $\pm 2$, $\pm 3 \ldots$). In one or more implementations, this second preamble portion may have operations performed thereon as may be selected from a Recipe of operations. In a particular implementation, this Recipe of operations may include one or more of: a phase shift operation (including identity and inversion); a frequency shift; a conjugate operation; a time reversal; and a slope operation.

Note that a receiver uses the difference between blocks in S0 and S1 to perform detection and synchronization operations. The receiver uses the slopes to deduce time and frequency shifts between TX and RX (realizing a system of 2 unknowns deduced from 2 equations), while reducing packet interferences, since different slopes induce low interference between sequences. More complex recipes also allow extra features (in addition to better validation in crowded environments in license-free bands). For example, such operations allow early packet selection/filtering, and/or network/group/user identification.

The receiver may use the progressive extra information from the signal, including phase-shifts in addition to modulus and frequency shifts, for refined synchronization in final steps. In this way, a good balance is realized between performance and complexity to improve behavior and interference mitigation, while keeping the default RX process simple for low-complexity receivers and packet length as low as possible. This also minimizes "wireless pollution" and waste of resources (especially if combined with scalable packets and networks).

Receiver processing is eased by selection of the preamble parameters, including selection of the sequences, Recipes and signal shaping/filtering. These parameters may be selected to realize good signal shaping (time and frequency properties for simple RF processing, including low-variations of power over time, efficient spectrum use, preshaping saved-sequences at twice the sampling frequency (Fs) and post-processing/filtering final waveforms).

In this way, RX algorithms can be simplified, particularly where linear frequency sweeps are used with a given well-chosen and known slope. Also, the receiver can readily handle usual impairments on the received signals (for robustness without high complexity increase). In particular, some processing can be done at a minimal sampling frequency (Fs) and benefit from frequency aliasing/circularity, while other processing steps could beneficially consider the information from input signals and/or sequence definitions at twice-Fs (as a half-Ts sample shift is equivalent to a fractional-bin frequency shift after correlation and FFT to increase frequency analysis resolution).

Figure 2A:
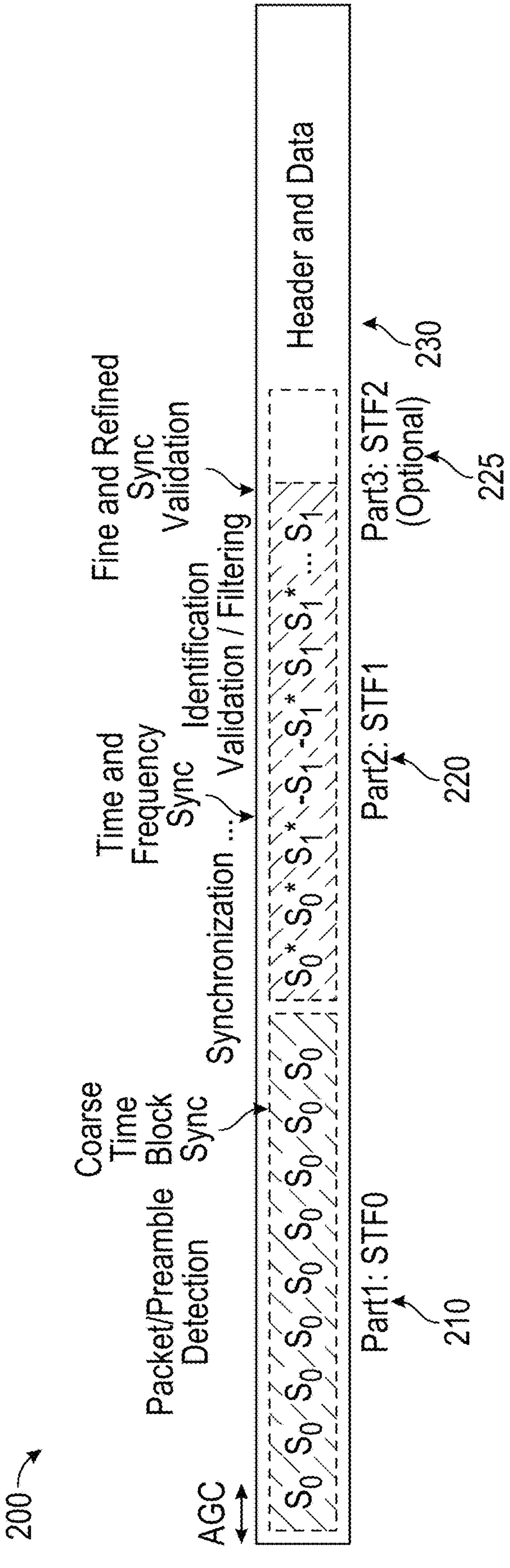
FIG. 2A is a graphical illustration of a packet in accordance with an embodiment.

Referring now to FIG. 2A, shown is a graphical illustration of a packet in accordance with an embodiment. As shown in FIG. 2A, packet 200 includes a preamble having separate fields as described herein. More particularly as shown, the preamble of packet 200 is composed of a first portion 210 that includes a sequence that is repeated for a first number of repetitions (L0 times). The value of the sequence and the number of repetitions may vary depending upon a particular use case. In one embodiment, the sequence (and potentially the number of repetitions) is known to transmitter and receiver, and may be pre-negotiated at least for the network. In some embodiments, a default Range, assigned to a device registered on a network, may be used to set a block size N, and a corresponding Group with which the device is associated may be used to determine the bandwidth/rate and a repetition scheme (e.g., Recipe of operations) to be included in the preamble. During receipt of first portion 210, a receiver may perform packet/preamble detection, and automatic gain control. In addition, by an end of first portion 210, the receiver may have reached a point of coarse time block synchronization (still biased by the Carrier-Frequency-Offset).

As further illustrated in FIG. 2A, preamble 200 also is composed of a second portion 220 that includes another sequence that is also repeated and which may have various Recipe operations performed thereon. In some cases the value of the sequence in second portion 220 equals the value of the sequence in first portion 210 (i.e., S1 equals S0), but with inversed slope using complex-conjugate operator.

In the example shown in FIG. 2A, example Recipe operations include conjugations or inverse operations; of course others are possible in different embodiments, including phase shifts and/or frequency shifts. During receipt of second portion 220, a receiver may reach synchronization (including coarse frequency synchronization). In addition, the receiver may, during second portion 220, perform identification validation (and filtering, when a packet is not intended for the receiver). Thus as shown in FIG. 2A, an optional third portion 225 may be present. As further shown in FIG. 2A, packet 200 includes a header portion and a payload portion.

In the example of FIG. 2A, S1 can equal S0 as its conjugate version is used at the beginning of STF1 (i.e., its inverse slope $V1=-V0$). In this simple example, there are no frequency shifts on the repetitions of the second part (simplified recipe operations), but this could be added for further performance improvements and interference mitigation.

A very low slope $V1=\pm 1/Q$ with large Q tends to define a signal close to narrowband tones; however, it is still more robust than a pure tone once correlated, and allows for phase continuity to limit edge effects on the signal after final filtering (shaping balance, e.g., PAPR vs OoB spectrum emissions) with smartly selected recipes with more flexibility than would do a tone with phase modulation/shifts. Recipes may include sufficient frequency shift operations over the preamble to properly spread the energy over the global spectrum to respect regulations and improve robustness. However, mid-values of slopes V1 may often be better choices for typical networks, preferring increasing first block size N up to receiver capabilities in cases of very long-range requirements instead of increasing Q.

The choice of STF1 sequences and Recipes can impact edge continuity; thus, smart selection and phase shifts over a Recipe's vector values can be done to favor phase continuity (order 1 continuity) at block edges, or even frequency continuity (order 2) if needed. Good selection of sequences, recipes and/or block-edge pre-processing before RF resampling/filtering can provide good waveforms with low OoB emissions (aggressive spectrum masks) and low power variation (almost always constant on the useful part and less than 1 dB PAPR due to final analog edge filtering impact in worst cases of usual IQ modulators). Direct-phase modulators can also be used to generate such waveforms (e.g., complex-values polar conversion), especially when considering subsets with continuity at order 2 (phase and frequency slow variations) to further increase efficiency with very simple low-cost systems when lowest-power consumption is targeted.

Recipes with given frequency-shifts at each STF1 block could be selected with frequency shifts being integer values of bin spacing in the FFT analysis, thus simplifying the reverse-shift at a receiver to sum these frequency outputs for simple analysis, but limiting the frequency resolution to the bin spacing. Thus Recipes with frequency shifts at each STF1/STF2 block that are not integer values of bin spacing (e.g., a fractional part like quarter spacing added at each new block) may help in having higher resolution to evaluate the frequency shift for synchronization. Moreover, knowing roughly the SNR (obtained from previous STF0 preamble estimations), a smoothing factor on this oversampled frequency figure (that is a noisy sampled and scaled version of the channel delay behavior) is possible before evaluating the ratio "expected area energy/peak" over "out-of-area energy" that is a good indicator of detection and remaining shift.

As discussed above, in some embodiments slope may be used as a parameter for STF1/STF2 Recipes to extend the principles to further improve performance in terms of synchronization and interference mitigation capabilities. One solution is to place the slope factor in the parameters of the Recipes. This would enable different slopes (low and high) in this portion of the preamble to be used to finely estimate frequency and time shifts with more precision depending on the slopes.

Depending on implementation, a transmitter may be configured to generate a preamble in either the time domain or the frequency domain. In some cases, generation of a preamble at an oversampled rate (e.g., 2×) is rather straightforward, with simple predefined sequences (which may be stored in a lookup table (LUT) in memory). These predefined sequences can have repetitions and have Recipes applied on these repetitions (e.g., simple complex operators as discussed above).

In memory, the sequences can be directly defined in the time domain at 2× (2N complex samples), or defined in the frequency domain (potentially over less samples if null on edges) using FFT conversion. Sequences can also be saved in polar coordinates instead of as IQ values (while angle is equally important over all the circle 2π for coherent correlation/aggregation of values, modulus can be fixed or with different/lower resolutions). The stored sequence in LUT storage enables the signal to be preshaped, especially if oversampled (trading off between time-shaping (PAPR) and frequency-shaping (OoB-mask)).

In some embodiments, a transmitter may include in a digital front end circuit reshaping filters that are optimized to limit PAPR or OoB emissions. As sequence blocks are already pre-shaped at a given sampling rate (e.g., 2×), additional block edge pre-processing at this rate could be beneficially performed before these filtering/upsampling stages.

Figure 2B:
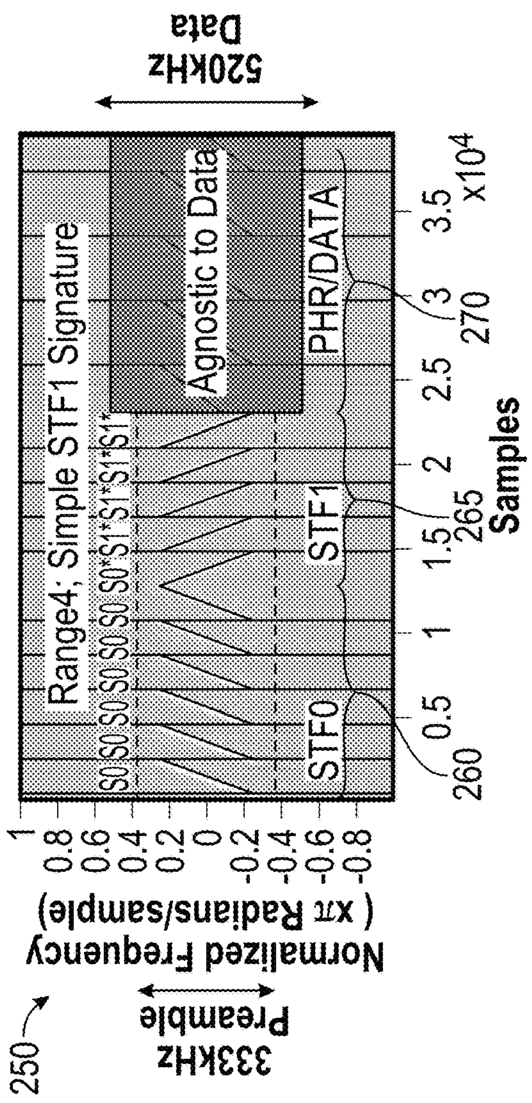
FIG. 2B is an example of a preamble for a first range using an embodiment.
Figure 2C:
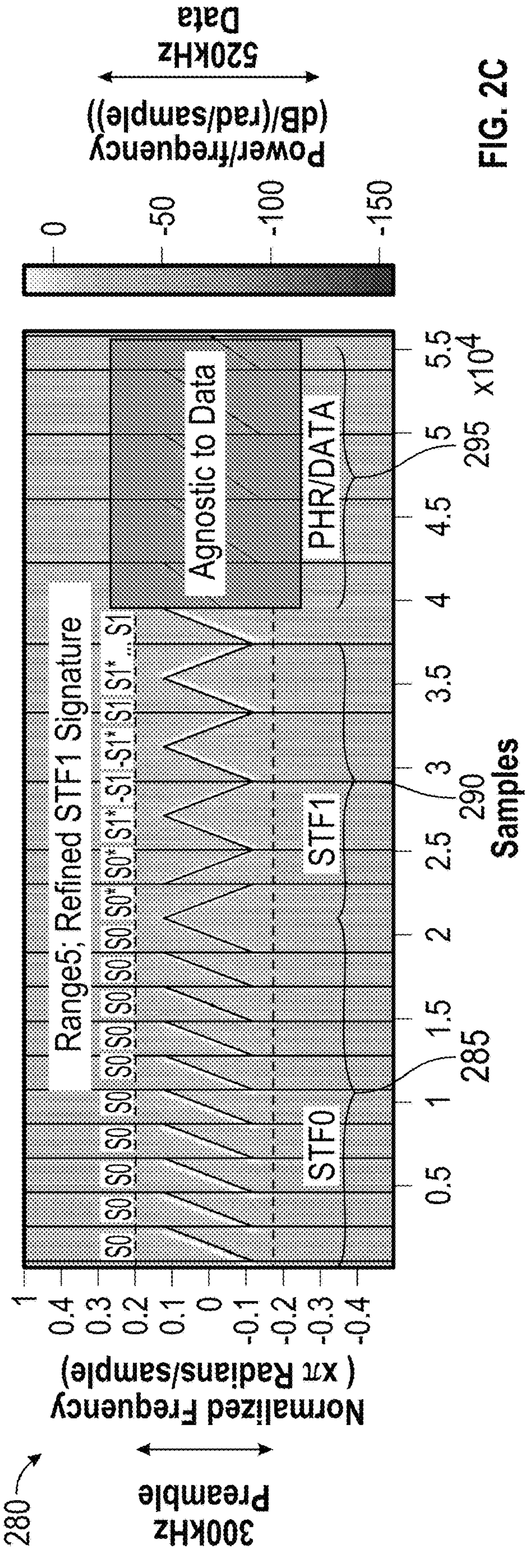
FIG. 2C is an example of a preamble for a second range using an embodiment.

Referring now to FIGS. 2B-2C, shown are examples of a preamble for different ranges using an embodiment. As illustrated, in a first example a preamble 250 includes a first portion 260 that is formed of a sequence S0 repeated a number of times. Preamble 250 further includes a second portion 260 that is formed of a signature having different recipes performed thereon (conjugates as shown). Thereafter, header and data portions 270 are transmitted.

FIG. 2C illustrates a second example of a preamble 280 that includes a first portion 285 that is formed of a sequence S0 repeated a number of times. Preamble 280 further includes a second portion 290 that is formed of a signature having different recipes performed thereon (conjugates and inversions as shown). I sequences in preamble 280 may be formed of more samples than those in preamble 250, as preamble to 280 is to be used for a longer range environment; Slopes could be lower to target longer ranges (e.g., using twice-length blocks N, and/or using lower preamble BW and related sampling frequency). Thereafter, header and data portions 295 are transmitted.

With this arrangement, the first portion of a preamble can be used for simple detection based on the repetition, while the signature of the second portion can be used for global validation, including synchronization, packet detection/validation, and potentially further used for ID selection/filtering capability (further validation, service/user/groupID).

In other embodiments, instead of a repeated sweep sequence for STF0 with frequency discontinuities at RF level, other preamble arrangements are possible. For example in other embodiments these RF constraints can be reduced by focusing on signals that are continuous at order 2 (i.e., in phase and frequency) on the whole preamble, limiting the possible combinations for GROUPS (for simultaneous packet orthogonality), but still providing a good balance between low-power low-cost and global network capacity for most of long-range applications.

In such embodiments, a preamble waveform has continuity in phase and frequency over the whole preamble; thus, "ZigZag" sweeps may be used for STF0. In these embodiments, RANGE may still define block sizes N and the number of blocks (the highest the range, the longer the preamble).

More specifically, a GROUP g0 subpart defines several BWs (typically in the 300-500 kHz range) and initial slope direction (positive or negative sweep, i.e. conjugate or not the signal) for the first block. Subsequent subgroups (e.g., g1,g2) may be used to refine slopes of sequences for a remainder of the preamble, and the considered recipes for this packet. Note that in some embodiments, a subset of g0 could be attributed to Downlink transmissions, and the remaining to Uplink transmissions.

In one example, the same configuration parameters as discussed above are kept, including the Range with N and number of blocks, for the same global preamble duration. For instance, range 7 can be 18 blocks of N=512 samples at Fs (for a total duration of 27.6 ms at 333 kHz BW). But this option limits the possible recipe combinations by ensuring a phase and frequency continuity over the whole preamble.

Figure 2D:
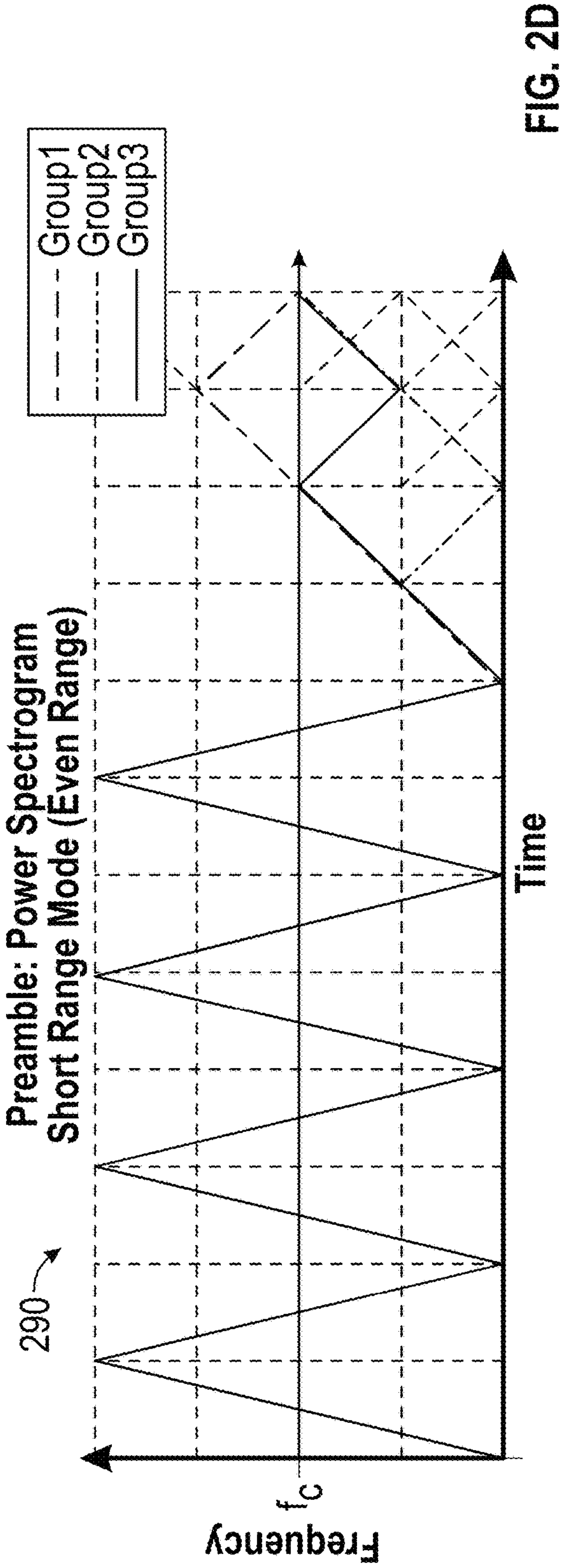
FIGS. 2D-2E are examples of preambles using another embodiment.
Figure 2E:
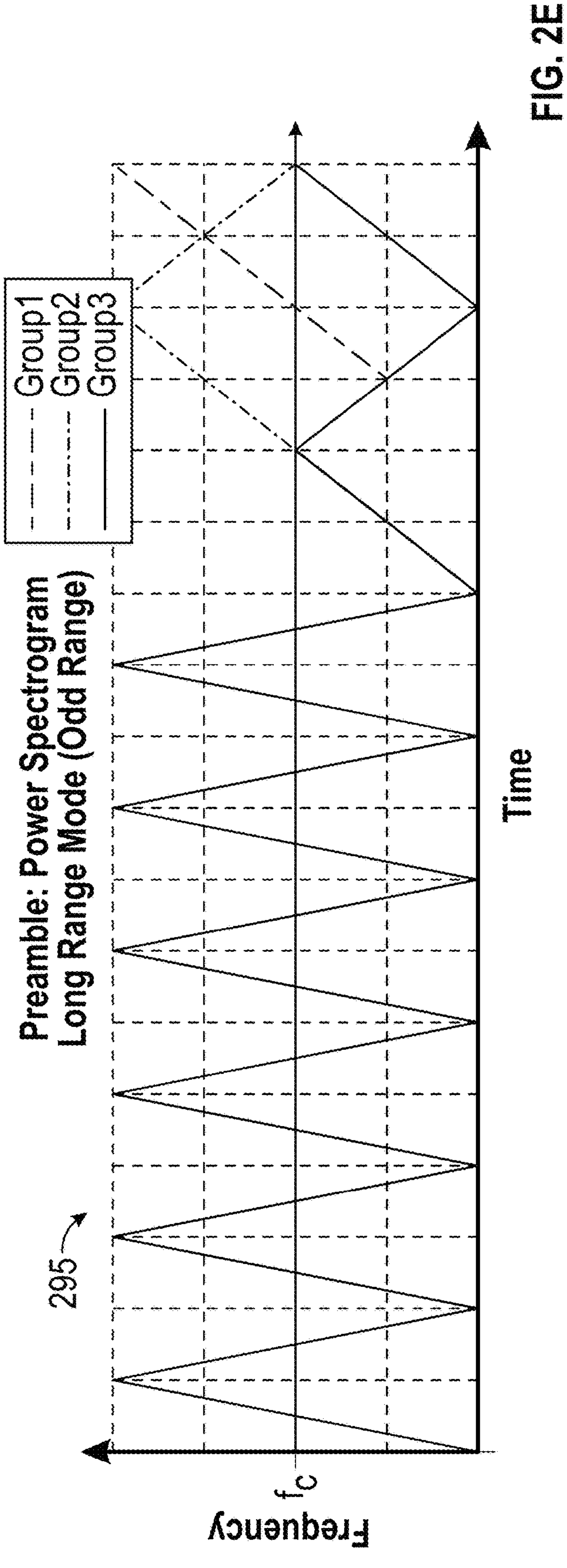

Referring now to FIGS. 2D and 2E, shown are graphical illustrations of example preambles for short (even) and long (odd) RANGE modes with continuous phase and frequency over a whole preamble. With small adaptation of RX algorithms, continuous signals in phase and frequency can be considered using proper recipe subsets on the whole preamble. This provides very good shaping in time and frequency, possibilities to generate signals with any device/RF at very low power and cost (including using direct-phase-modulations), while preserving good performance and some groups for multiple-access capabilities in long-range networks.

Figure 3:
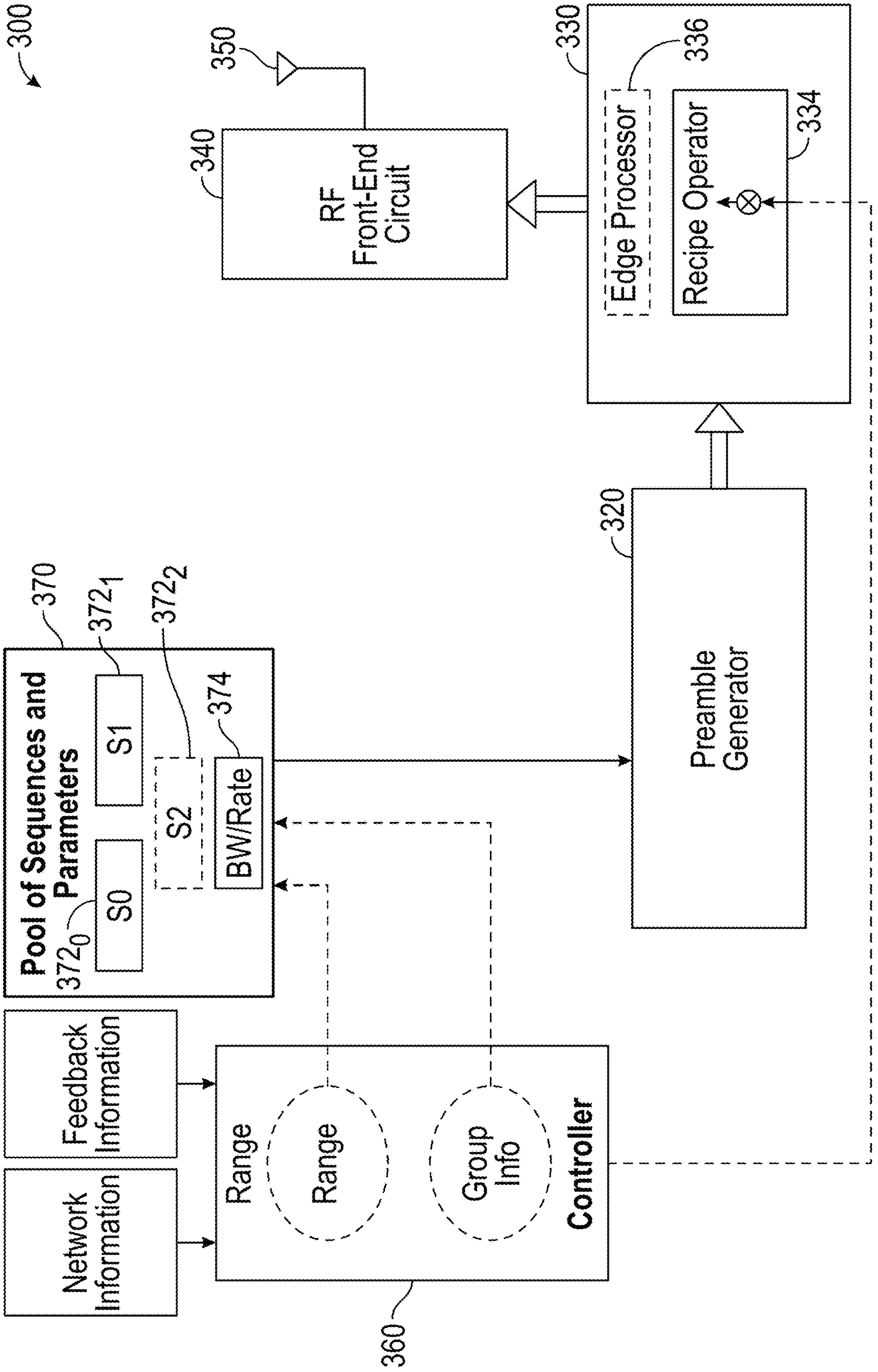
FIG. 3 is a block diagram of a more detailed implementation of a transmitter in accordance with an embodiment.

Referring now to FIG. 3, shown is a block diagram of a more detailed implementation of a transmitter in accordance with an embodiment. Depending on implementation, the transmitter can generate a signal either in time or in frequency using an OFDM transmitter. As illustrated, transmitter 300 includes various hardware, firmware, and software that forms a signal processing path to generate adequate preambles. In addition, a controller 360 is coupled to the signal processing path to determine selection of a preamble formation and appropriate SS, modulation scheme, replication, and Recipe of operations to be performed on preamble sequences and/or the replicated modulated SS. To this end, controller 360 may be a programmable hardware circuit that is configured to execute instructions such as may be stored in one or more non-transitory storage media.

As shown, controller 360 can receive a variety of parameters, including information received from a network. In an embodiment, the network information may include framing structures, Range, Group and the related Recipe information associated with a device. In an embodiment, the Group information may be a value for a user in a cell area be as low as possible interfering with other signals, allowing selection of adequate SS (including BW/slope) and Recipes (avoiding too similar waveforms in the same area).

In one or more embodiments, Range and Group information may be used to determine preamble format, including selection of appropriate sequences, Recipes and so forth.

Thus from a transmitter point of view (e.g., transmitter 300 of FIG. 3), a Range setting (agreed at initial association of the device in the network to reduce a default worst-case packet length) and potential Network/Group information, can be used to define a bandwidth/rate of the preamble (e.g., from 300 to 500 kHz by a step of 33 kHz) and related sweep-sequence parameters (slope factor of +/−1 for STF0 and can be lower $+/-1/Q_1$ and $+/-1/Q_2$ for next parts STF1/2) and the Recipes (e.g., a simple pure repetition for STF0, and a more complex combination of operators applied on the repeated S1/S2 for the second part of the preamble).

Note that a given preamble bandwidth (BW), generally lower than that of a data portion (and generally associated to the highest levels of the GROUP notion or network identification to mitigate interferences in license-free bands), enables receivers to consider adapted RX filtering and downsampling, with a lower sampling frequency related to the BW (or N times this BW) for simple RX preamble algorithms benefiting from sampling frequency aliasing. In this way, low-power but efficient listening modes are possible for detection, and several simultaneous BW/networks/groups are also possible.

Reducing the preamble BW also allows to handle CFO (Carrier Frequency Offsets) as the transmitter and receivers are not yet aligned while not synchronized. This allows robust designs without having to increase usual system receiver filter bandwidth, and generally slightly increases sensitivity for the same transmit power, without really changing shaping and still respecting regulation constraints.

Still with reference to FIG. 3, based at least on the Range and Group information, controller 360 selects appropriate sequences for preamble sequences, e.g., from a pool 370 (which may be a table-based memory) that stores different possible sequences $\mathbf{372}_{0\text{-}2}$, for use in generating the different preamble portions, along with selected Recipes (for at least the second portion of the preamble). Pool 370 may further store bandwidth/rate information 374, which controller 360 may use in selecting an appropriate bandwidth for the preamble. Depending upon implementation, the pool of sequences may be stored in a non-volatile memory where the pool is predetermined and stored as part of firmware. In other cases, the sequences may be dynamically determined and stored, e.g., in a lookup table, or even generated 'on-the-fly' or dynamically.

Controller 360 configures a preamble generator 320 to generate at least the first portion of the preamble using the above-described parameters, as well as determining a sequence for the second portion of the preamble. An additional generator such as Recipe operator 330 (with an example specific operator 334) is configured to apply the succession of sequences*recipes for this second portion (and optionally additional portions) to generate the digital signal (loop); and then to transmit it to a RF front-end circuit 340, which transmits the preamble followed by header and data portions.

Note additional digital processing by way of an optional edge processor 336 can be done after the concatenation of the "reciped-sequences" to generate a final waveform, e.g., smoothing edges before interpolation/oversampling/filtering stages of a digital front-end circuit (as may be present in Recipe operator 330 or in RF front-end circuit 340). In this way, a signal may maintain good shaping properties after its digital-to-analog conversion, i.e., providing a good spectrum while keeping power variations as low as possible (PAPR close to 0 dB). RF front-end circuit 340 can use any modulator, e.g., an IQ modulator with adequate Digital Front-End and High-Frequency processing, or a phase modulator with minimal RF processing for instance; the signal being adapted to low-power RF and transmitters.

Note that transmitter 300 may transmit a packet as a collection of frames, where there may be different frames for preamble, header1, header2, and data (as an example). Each frame may have its own settings (defined from fixed/top-level common parameters and/or a previous frame). In turn a frame may be constructed with a given number of blocks. Headers generally have a fixed and known number of blocks for a given Range/MCS. A data portion of a packet may be formed of a variable number of blocks (each packet having different number of bits to transmit, where a data length is given in the headers). Although shown at this high level in the embodiment of FIG. 3, many variations and alternatives are possible.

Note also that sampling frequency and bandwidth can be adjusted for the preamble. For example, a Fs can equal the bandwidth, which in the FIGS. 2B-2C illustrations is 333 kHz (half the sampling frequency of IEEE 802.15.4g option 2) and 300 kHz, to simplify processing, improve performance, and handle frequency error. As further shown, this bandwidth may slightly differ from preamble to header/data.

Furthermore, the slopes may differ among Ranges, UL/DL, and other standards to minimize interference. In an embodiment, sequence S0 generally has a full slope over the BW per sequence, to allow continuity (in phase and 'circular-frequency' sampled at Fs) at receivers that are not synchronized and that perform simple correlations with the expected sequence at Fs, while second sequence S1 has a different slope from S0 (e.g., in the other direction) to allow time and frequency error estimations, and related corrections at receivers. In an implementation in which a preamble has a third portion, its third sequence S2 could have a different slope from S0 and S1 (e.g., not using the full preamble BW) and a specific Recipe of operations on each repeated sequence.

Referring now to Table 1, shown are example sequences for various ranges in accordance with one implementation. Although shown with these specific examples, understand that other sequences can be used in other implementations.

TABLE 1

| RANGE # | Preamble Duration @333 kHz | Block Length N | STF0: L0 repetitions | STF1: L1 + L2 repetitions [+Recipe] | Target SNR & sensitivity (AWGN) |
|---|---|---|---|---|---|
| 0 | 2.3 ms | 64 | 5 or 6 | 6:<br>ex1: $[S_1^*, -S_1^*, S_1^*, D_{g1}(-S_1^*), 2D_{g1}(S_1^*), S_2]$<br>ex2: $[S_0^*, S_0^*, -S_1^*, D_{g1}(-S_1^*), 2D_{g1}(S_1^*),,$ $3D_{g1}(S_1^*)]$ | −7 dB→−121 dBm |

TABLE 1-continued

| RANGE # | Preamble Duration @333 kHz | Block Length N | STF0: L0 repetitions | STF1: L1 + L2 repetitions [+Recipe] | Target SNR & sensitivity (AWGN) |
|---|---|---|---|---|---|
| 1 | 3.5 ms | 64 | 9 | 9:<br>ex1: $[S_1^*, S_1^*, D_f(-S_1^*), D_f(-S_1^*), 2D_f(S_1^*),$<br>$2D_f(S_1^*), D_{g1}(3D_f(-S_1^*)), 2D_{g1}(3D_f(-S_1^*)), S_2]$<br>ex2: $[S_0^*, S_0^*, S_0^*, D_f(-S_1^*), D_f(-S_1^*),$<br>$2D_f(-S_1^*), 2D_f(S_1^*), D_{g1}(3D_f(-S_1^*)),$<br>$2D_{g1}(3D_f(-S_1^*))]$ | −9 dB→−123 dBm |
| 2 | 4.6 ms | 128 | 6 | 6:<br>ex1: $[S_1^*, -S_1^*, S_1^*, D_f(-S_1^*), D_f(S_1^*), S_2]$<br>ex2: $[S_0^*, S_0^*, -S_1^*, D_{g1}(-S_1^*), 2D_{g1}(S_1^*),,$<br>$3D_{g1}(S_1^*)]$ | −10 dB→−124 dBm |
| 3 | 6.9 ms | 128 | 9 | 9:<br>ex1: $[S_1^*, S_1^*, D_f(-S_1^*), D_f(-S_1^*), 2D_f(S_1^*),$<br>$2D_f(S_1^*), D_{g1}(3D_f(-S_1^*)), 2D_{g1}(3D_f(-S_1^*)), S_2]$<br>ex2: $[S_0^*, S_0^*, S_0^*, D_f(-S_1^*), D_f(-S_1^*),$<br>$2D_f(-S_1^*), 2D_f(S_1^*), D_{g1}(3D_f(-S_1^*)),$<br>$2D_{g1}(3D_f(-S_1^*))]$ | −12 dB→−126 dBm |
| 4 | 9.2 ms | 256 | 6 | 6:<br>ex1: $[S_1^*, -S_1^*, S_1^*, D_f(-S_1^*), D_f(S_1^*), S_2]$<br>ex2: $[S_0^*, S_0^*, -S_1^*, D_{g1}(-S_1^*), 2D_{g1}(S_1^*),,$<br>$3D_{g1}(S_1^*)]$ | −13 dB→−127 dBm |
| 5 | 13.8 ms | 256 | 9 or 10 | 9:<br>ex1: $[S_1^*, S_1^*, D_f(-S_1^*), D_f(-S_1^*), 2D_f(S_1^*),$<br>$2D_f(S_1^*), D_{g1}(3D_f(-S_1^*)), 2D_{g1}(3D_f(-S_1^*)), S_2]$<br>ex2: $[S_0^*, S_0^*, S_0^*, D_f(-S_1^*), D_f(-S_1^*),$<br>$2D_f(-S_1^*), 2D_f(S_1^*), D_{g1}(3D_f(-S_1^*)),$<br>$2D_{g1}(3D_f(-S_1^*))]$ | −15 dB→−129 dBm |
| 6 | 18.4 ms | 512 | 6 | 6:<br>ex1: $[S_1^*, -S_1^*, S_1^*, D_f(-S_1^*), D_f(S_1^*), S_2]$<br>ex2: $[S_0^*, S_0^*, -S_1^*, D_{g1}(-S_1^*), 2D_{g1}(S_1^*),,$<br>$3D_{g1}(S_1^*)]$ | −16 dB→−130 dBm |
| 7 | 27.6 ms | 512 | 9 or 10 | 9:<br>ex1: $[S_1^*, S_1^*, D_f(-S_1^*), D_f(-S_1^*), 2D_f(S_1^*),$<br>$2D_f(S_1^*), D_{g1}(3D_f(-S_1^*)), 2D_{g1}(3D_f(-S_1^*)), S_2]$<br>ex2: $[S_0^*, S_0^*, S_0^*, D_f(-S_1^*), D_f(-S_1^*),$<br>$2D_f(-S_1^*), 2D_f(S_1^*), D_{g1}(3D_f(-S_1^*)),$<br>$2D_{g1}(3D_f(-S_1^*))]$ | −18 dB→−132 dBm |

In the above Table, Dt is an operation (typically a given frequency shift that is predetermined) to distinguish long/short range modes, while Dg is an operation (typically a frequency shift or phase shift) to distinguish Groups.

Referring now to Table 2, shown is an example second portion of a preamble, where the first portion is formed of a plurality of repetitions of a first sequence (S0). This second portion may be formed using a second sequence that is a conjugate of the first sequence: S1=conj (S0), or having a lower slope than the first sequence, and potential processing/distinction of short/long range packets using processes per 2 blocks for short range, 3 blocks for long range.

information over a large part of the bandwidth. Moreover, different Recipes for different Groups improve interference mitigation among packets, their signature to validate the detection, early packet filtering, and can improve estimations using fractional phase and/or frequency shifts if needed to ease estimation at receivers.

Note that smart choices of TX signal parameters for different users of a network can improve operation (like final steps' detection trade-offs with high robustness, identification/filtering, accurate estimations and synchronization) while keeping TX signal with very good shaping properties (good/ideal frequency spectrum as rectangular as possible

TABLE 2

| | |
|---|---|
| Short: | STF0 = [S0 S0 S0 S0 S0 S0], STF1 = [S0{4, 4}, S1{5, 5 + 1*DfG, 4 + 2*DfG, 4 + 3*DfG}] (2blk for block detection/ambiguity removal, and valid1; next blks for finer estimations and identification and valid2) |
| Long: | STF0 = [S0 S0 S0 S0 S0 S0 S0 S0 S0], STF1 = [S0{4, 4, 4}, S1{5, 5, 5 + 1*DfG, 4 + 1*DfG, 4 + 2*DfG, 4 + 2*DfG}] (3blk for block det/ambiguity remov, and valid1; next more blks for finer estimations and identification and valid2) |

Note that the number in curly braces are the Recipe value, where 4 stands for Complex-Conjugate, 5 for minus-Complex-Conjugate, and DfX are Frequency-shift operations. As an example, S1 = S0{4} is the conjugate of S0 sequence.

With this arrangement, a preamble is defined that is deterministic (dependent on Range*Group, without modulation). As such, it can be optimized with well-chosen variations of frequency over time, as examples below will show.

Smart selection of Recipes enables good waveform shaping while preserving continuity at block edges and spreading with low OoB emissions while having low TX power variation over time, i.e. PAPR close to 0 dB).

In some embodiments, the validation/recovery of (part of) Range and Group information can be extended to the preamble of the packet, for further scalability, early packet interference mitigation and identification, and global long-range system efficiency. In such cases, the split between preamble and early portions of the header (PHR) for validation and recovery of these top parameters can depend on design choices for a given network.

Figure 4:
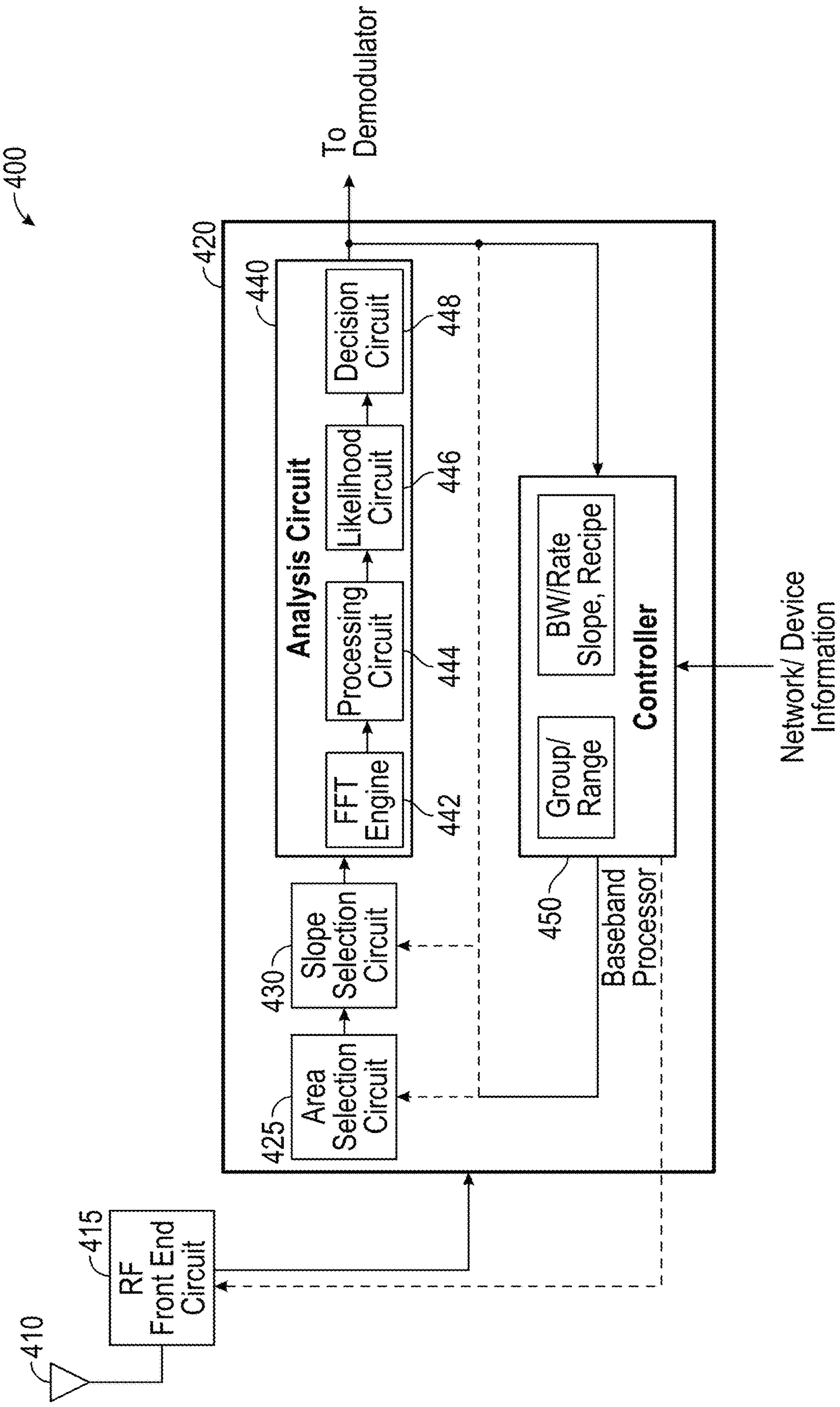
FIG. 4 is a block diagram of a receiver in accordance with an embodiment.

Referring now to FIG. 4, shown is a block diagram of a receiver in accordance with an embodiment. As shown in FIG. 4, receiver 400 is configured to receive and process preamble information of packets as described above (and additionally header and data portions). Although shown as a separate circuit, in some cases, a transmitter and receiver can be implemented as a transceiver in a single device (and may share at least some common circuitry).

As shown, incoming RF signals are received via an antenna 410 and provided to an RF front end circuit 415. Front end circuit 415 may perform various RF processing, including amplification in a low noise amplifier, filtering, downconversion and digitization. In turn, resulting digital information, e.g., at baseband, is provided to a baseband processor 420.

Baseband processor 420 may perform processing on a preamble portion of a packet to enable to determine valid packet detection. Such processing is shown at a high level in FIG. 4. Depending on implementation, receiver processing can be done either in time or frequency domains, at Fs or higher sampling rate. For simple preamble processing while not knowing the frequency error at an initial phase, a simple solution may be to perform a correlation in the time domain (received signal* expected sequence conjugated) and an FFT analysis. As a first solution, the absolute value of the FFT result is analyzed, to find the maximum bin, after averaging several corrected blocks. To be more robust to time and frequency offsets, more analyses can be performed, e.g., analysis of several correlations*FFT on blocks every N/2 samples. Still for better peak analysis, if the input signal or reference sequence is provided at twice sampling rate (2Fs), a shift of 1 sample allows the receiver to analyze mid-bin values.

Understand that after valid packet detection and synchronization, receiver 400 may demodulate header and data portions of the packet (additional processing circuitry for these portions are not shown for ease of illustration here).

At a high level, receiver 400 operates as follows. Preamble parameters, including Range/Group, BW, Sequences, and/or Recipes can be used to perform packet detection and synchronization. First, the input signal is filtered (depending on a given Step of multiple iterative Steps 0-N) and resampled if needed, and correlation(s) are done (with a first expected sequence S0 at Step0, etc.). In an embodiment, these correlations are converted into the frequency domain (via an FFT operation), and potentially combined over several blocks (e.g., sum or weighted sum of their absolute values for Step0 with a potential high frequency error and unknown starting blocks). Then receiver 400 analyzes key indicators (e.g., indexes of maximum powers in the FFT bins and their values) over several blocks to determine a level of likelihood for this first step of packet detection.

Next, receiver 400 determines whether a valid signal is potentially detected and if so, proceeding to a next Step, to further process the input signal with some adjustments, e.g., a first correction of the roughly estimated beginning of blocks (to process each block), and a potentially refined optional filtering. Then several correlations(s) are done (with expected sequences S0 and S1, etc.). As above, these correlations are converted into the frequency domain (via FFT operation), and can be combined over several blocks if needed to validate detection.

Comparisons can also be done to detect the S0-to-S1 switch and remove any ambiguity on the position of the beginning of packet (due to repetitions). From a bin index analyses (e.g., maximum power estimation) of the transformed-correlation over the 2 parts (S0 and S1), the 2 errors of time-shift and frequency-shift between TX and RX can be estimated (based on the fact that S0 and S1 have different slopes or direction, to have 2 equations for the 2 unknowns to solve). These errors are then removed (correction of frequency and time in the next Steps). Then a final Step can be performed to further validate, identify, and improve synchronization (time and frequency error estimation refinements) until the end of preamble (optionally using phase information and complex values instead of absolute values, given the better synchronization at the end of the preamble).

Still referring to FIG. 4, digital information from front end circuit 415 is provided to an area selection circuit 425. To begin preamble processing, area selection circuit 425 is configured at a first step (on STF0) to select an area that is adapted to the equivalent channel between transmitter and receiver; in noisy channels with TX to RX frequency mismatches, it can be rather large in frequency (e.g., Preamble BW+/−40 ppm filtering), to handle potential frequency errors (CFO) and as timing is unknown (no knowledge of block edges is yet available).

In one or more implementations, area selection, which also means in part a filtering of the expected frequency bandwidth, can be split between RF front end circuit 415 and area selection circuit 425. In this way, different stages of filtering and resampling can work in shared wireless mediums with many noises and interferences (as shown by the feedback paths in FIG. 4). As a result, interferers can be filtered as soon as possible. Then, signal blocks could be rather localized, e.g., narrowed BW (<500 kHz and even lower) and limited in time (e.g., a reasonable N=256 at 333 kHz represents 0.768 ms), but using diversity and interleaving, several resources spread over time and frequency can balance noise and interference and limit this probability of having too many lost blocks. And the filtering stages and area selection within RF front end circuit 415 enable receipt of a sufficiently useful signal, included in crowded multipath environments, or with spurious and such impairments. With such operation with front end processing and dynamic adaptation to keep only the minimal bandwidth and time of the block to avoid interferences, while properly spreading useful information on well-chosen "signatures" easy to filter/distinguish and "de-noise", good performance can be realized in a wide variety of environments.

The determined area selection is provided to a slope selection circuit 430, which may include a plurality of correlators to perform correlations on the incoming information with expected sequences. To this end, the correlations are performed with the conj (S0) sequence (to remove the S0 slope) at Step0. Next, the processed information is provided to an analysis circuit 440.

To keep simplifications of frequency circularity at Fs, even if sequences are defined at 2×, the input signal can be filtered (e.g., approximately 420 kHz over the 666 kHz bandwidth, if the useful part is 333 kHz+FreqError=+/−40 kHz) to reduce noise bandwidth, and partially used (e.g., at Fs sampling rate using half of the samples). For example, one sample over two can be used for each block to analyze. Such processing can be done on even samples (phase0) and also on odd samples (phase1) with the same correlation (reference expected sequence with the same phase0) to get twice frequency resolution for analysis (better identification of peak (maximum bin), better precision ×2 for corrections for next steps). In this way, better performance is realized without destroying the circularity simplification of FFT (that are kept at a lowest block size N).

The block processing (1 or 2 correlations*FFT=snapshots) can be done several times per block N. In that case, circular/continuous correlations may be performed, e.g., with a shifted starting index on the reference sequence to always have the same maximum bins at the same place, simplifying the next recombination without needing NCO shifts.

As shown, analysis circuit 440 includes an FFT engine 442, additional processing circuitry 444, which may process the resulting FFT bins, a likelihood circuit 446 to determine a likelihood of valid preamble detection, and a decision circuit 448 to generate a decision based on the processed information.

FFT engine 442 is configured to transform the incoming time domain samples into the frequency domain as a plurality of FFT bins. Processing circuit 444 may analyze these FFT bins corresponding to consecutive chunks of the incoming signal to detect peaks of power (looking at absolute values to detect a signal with this proper slope and repetition period). In some embodiments, block window filtering can be done before FFT to reduce edge effects of a rectangular block in a dimension that provide a sinc oscillation in the other domain. In some embodiments, several processed blocks (e.g., 4 to 8 windows of size N@Fs after FFT) can be saved and combined (e.g., aggregated, weighted summed in absolute value/complex value vs. Recipes of each range, along with potential shifts and removal of defective blocks). In this way, receiver 400 can slightly replay previous blocks at each step to still reduce the preamble length and obtain desired preamble processing (detection/validation/synchronization in time or frequency).

Next, likelihood circuit 446 computes likelihood values over the time when receiver 400 is listening to the channel. These likelihood decisions are provided to decision circuit 448, which identifies if sufficient criteria appear to validate a probable packet. If so, decision circuit 448 provides the most probable position (index of the peak) to the next step of processing (in a loop back to area selection circuit 425 and slope selection circuit 430).

Now these circuits operate at a second step (looking at STF0 and STF1 transition and values/positions). While the area may still be large in frequency, rough block edges are known from the previous peak position to align processed blocks. In this second step, slope selection circuit 430 performs correlations with S0 and S1 sequences. In turn, analysis circuit 440 performs analysis mainly based on FFTs of consecutive chunks of the signal to analyze the peak of power (based on absolute values). The likelihood values that are computed in this step enable detection of the transition from STF0 to STF1, removing block ambiguity to detect coarse/block timing alignment.

More specifically, the likelihood values and indexes are computed on both sequences to get two different sets of indexes (peak positions). From these 2 shift values and knowing the slopes of the 2 sequences (S0 vs S1), the frequency error (CFO) and timing error (block/sampling timing offset) between TX and RX can be determined, to correct them before the next step.

To quickly summarize the synchronization estimation principle, if we call D0 and D1 the maximum estimated bins on S0 and S1 respectively (reversed-shifted if needed depending on a given Recipe), and V0 and V1 the respective slopes of S0 and S1, from these 4 parameters {D0,D1, V0,V1}, a block-timing error estimation can be determined (to realign start of blocks) and carrier frequency error estimation (CFO). From the values of the analyses over the preamble (including in the complex domain if needed to improve the absolute modulus estimations at the end of processing), the estimations can be refined, the time block shift ambiguity can be removed and a very good validation reliability is provided.

All this processing allows receiver 400 to further validate a probable packet or not based on the preamble (if not, restart listening from Step0, otherwise continue on Step2). At an (optional) third step, area can be further refined from previous estimations (CFO frequency error is corrected, e.g., using a NCO on the input signal), and timing can also be corrected to process per block with finer adjustments. In this third step, slope selections (correlations) and reverse-Recipe operations (complex-operators on the blocks like inversion/phase-shift or NCO/frequency shift) can occur to further analyze the signal. Note that (optional) refined complex processing (using phase in addition to absolute value outputs), around expected areas (knowing expected frequency/shift peaks) once synchronized can further improve performance.

Analysis of these processes allows receiver 400 to refine detection probability (lowering false alarms while keeping high detection capabilities from first steps), validating the expected packet and (optionally) filtering it (if different slopes and/or Recipes for the different Range*Groups). When a packet is determined to not be for receiver 400, there is no need for decoding, saving power and time to go back to listening at Step0 as early as possible, increasing efficiency. For valid packets, refined estimations (with more accurate positions and estimations of shifts, including time and frequency synchronization) enable more efficient receipt and processing.

In some embodiments, an optional identification of a subgroup (from the observed Recipe, including optional frequency and/or phase shift over the end of preamble) could be done (e.g., to filter packets that are not for the receiver). Moreover, an optional short vs. long preamble blind detection could be done (can be useful in uplink).

When a valid packet is detected, further portions of the packet including header and data portions can be processed in receiver 400 (including within the processing path of baseband processor 420) before providing resulting processed information to additional processing circuitry including a demodulator, (optional) descrambler, and decoder that is configured to perform a reverse set of operations as performed in a modulator on the transmit side.

The selection of operations and configuration of demodulator may be performed under control of a controller 450, which may determine an appropriate configuration of the demodulator to perform demodulation based at least in part on the information parameters, including Range, Group and MCS information. Depending on implementation, this information may be received as one or more of network information, feedback information, and/or measurement information. Based on at least some of the information parameters, controller 450 may determine an appropriate reverse Recipe of operations to perform on incoming blocks to enable recovery of a given symbol as well as to determine whether shaping operations including edge processing, window and filtering or so forth is to occur. Controller 450 may be a programmable hardware circuit that is configured to execute instructions such as may be stored in one or more non-transitory storage media.

Understand while shown at this high level of FIG. 4, many variations and alternatives are possible. For example the correlation process can be performed in the frequency domain (using FFTs before correlations; remember that the Digital Fourier Transform of circular correlations of the 2 sequences, is equivalent to the pointwise multiplication of their respective Digital Fourier Transform). As another example of implementation, correlation and FFT per block (in 430 and 442) could be merged and replaced by a continuous correlation with accumulation.

With embodiments, preamble energy can be globally well distributed over the preamble bandwidth (e.g., 333 to 450 kHz), and the preamble itself is robust to interferers (including continuous wave and narrowband) and fading, and to frequency errors/drifts. It can perfectly respect most stringent regulations and is particularly efficient to preserve wireless resource, without requiring high-complexity devices and networks. A preamble in accordance with an embodiment may have very low PAPR (e.g., less than 1 dB) and very low OoB emissions (e.g., greater than 50 dB rejection at 500 kHz bandwidth). Scalability of the preamble definition can be obtained by changing sequence length and number of repetitions/recipes, with further scalability in density (based on groups for networks/services/users IDs, to mitigate interferences/lock).

As an example, different/lower slopes on final steps, and/or different frequency shifts (fractional, specific to these preambles), can improve interference mitigation and estimation processes, including improve FFT output resolution to better estimate the peaks in the analyzers if required by the following modulation, e.g., if the peaks were in-between 2 bins (improving estimations using intermediate bins and smoothing/filtering).

Embodiments implementing a preamble as described herein are efficient (and low-power, scalable in range/duration, user density/interference, and potentially optional RX processing) for robust packets in real multipath channels (e.g., license-free bands having significant interference and potentially crowded environments) that may be used by IoT devices, and with low-cost receivers with usual impairments (DC-offset, spurs and tones, time and frequency synchronization offsets).

Thus as described herein, a preamble generator in accordance with an embodiment can dynamically adapt generation of preambles based on characteristics of at least group and range information. In one example, a preamble may be generated with a first level of precision/constraint on signal choices, including: a first portion having simple linear sweeps; and at least a second portion having linear sweeps ‘reciped,’ ensuring first order (phase) continuity. In another example, a preamble may be generated with a second level of precision/constraint on signal choices, including: a first portion having simple linear sweeps; and at least a second portion having linear sweeps ‘reciped,’ ensuring second order (phase and frequency) continuity. In yet another example, a preamble may be generated with a third level of precision/constraint on signal choices, including: a first portion having linear sweeps ensuring second order continuity (phase and frequency, e.g., using “zigzag”); and at least a second portion having linear sweeps ‘reciped,’ ensuring second order (phase and frequency) continuity. Note in any of these examples, potential edge processing can occur at block edges to smooth the signal to reduce variations and tend to this continuity.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:

a circuit to generate a packet having a preamble and at least one of a header or a data portion, wherein the preamble comprises a first field and a second field, the first field comprising a first sequence that is repeated a plurality of times, a length of the first sequence and a number of the plurality of times based at least in part on a range between the apparatus and a receiver; and a radio frequency (RF) front end circuit coupled to the circuit to process and transmit the packet.

2. The apparatus of claim 1, further comprising a controller coupled to the circuit, wherein the controller is to determine parameters of the preamble, the parameters comprising the length of the first sequence and the number of the plurality of times based at least in part on a range parameter and a group parameter to identify a network having the apparatus and the receiver.

3. The apparatus of claim 2, wherein the controller is to pre-negotiate at least the first sequence with the receiver.

4. The apparatus of claim 1, wherein the circuit is to generate the preamble having the first sequence with a full slope over a bandwidth of the preamble, to enable continuity in phase and discrete-time frequency blocks once sampled at a given bandwidth frequency at the receiver, the receiver comprising an unsynchronized receiver to perform a correlation between the first field and an expected sequence corresponding to the first sequence.

5. The apparatus of claim 1, wherein the circuit is to generate the preamble having the second field comprising a second sequence that is repeated a second plurality of times.

6. The apparatus of claim 5, wherein the circuit is to perform, on the second sequence for some of the second plurality of times, at least one operation according to a Recipe of operations.

7. The apparatus of claim 6, wherein the circuit is to perform, on the second sequence for the some of the second plurality of times, the at least one operation according to the Recipe of operations comprising one or more of:

a phase shift operation;

a frequency shift;

a conjugate operation;

a time reversal; or a slope operation.

8. The apparatus of claim 1, wherein the circuit is to generate the first sequence having a value and a bandwidth based at least in part on the range and a subpart of a group parameter, the group parameter subpart to identify at least one of a network or service having the apparatus and the receiver, to enable packet detection and mitigate interference and reduce false alarms.

9. The apparatus of claim 1, wherein the circuit is to generate the preamble comprising a third field having a third sequence that is repeated a third plurality of times, the circuit to perform, on the third sequence for at least some of the third plurality of times, at least one operation according to a Recipe of operations, wherein the third sequence is to enable further packet validation, enable a non-targeted receiver to filter the packet, and enable synchronization to retrieve time and frequency accurate estimations and alignment with the transmitter.

10. The apparatus of claim 1, further comprising at least one memory to store a table, the table comprising a plurality of sequences from which the first sequence is to be selected.

11. The apparatus of claim 1, wherein the circuit is to generate the preamble having a first bandwidth, the first bandwidth less than a bandwidth of the header and the data portion.

12. A method comprising:
determining, in a controller of a transmitter, a first sequence and a second sequence for a preamble of a packet, based at least in part on a range between the transmitter and a receiver and a group identifier known at the transmitter and the receiver in a network comprising the transmitter and the receiver;
forming a first portion of the preamble comprising a first plurality of repetitions of the first sequence;
forming a second portion of the preamble comprising a second plurality of repetitions of the second sequence, comprising performing, on one or more of the second plurality of repetitions of the second sequence, a plurality of operations according to a Recipe of operations; and
transmitting, from the transmitter, a radio frequency (RF) signal comprising a packet comprising the preamble.

13. The method of claim 12, further comprising:
when the range is less than a first distance, forming the first portion of the preamble comprising a first number of the first plurality of repetitions, the first sequence having a first length; and
when the range exceeds the first distance, forming the first portion of the preamble comprising at least one of:
a second number of the first plurality of repetitions, the second number greater than the first number; and
the first sequence having a second length greater than the first length.

14. The method of claim 12, further comprising:
forming the first portion of the preamble comprising the first plurality of repetitions of the first sequence, each of the first plurality of repetitions having a first slope; and
forming the second portion of the preamble comprising the second plurality of repetitions of the second sequence, each of the second plurality of repetitions having a second slope, the second slope different than the first slope.

15. The method of claim 12, further comprising performing, on the one or more of the second plurality of repetitions of the second portion, the plurality of operations according to the Recipe of operations comprising one or more of:
a phase shift operation;
a frequency shift;
a conjugate operation;
a time reversal; or
a slope operation.

16. The method of claim 12, further comprising:
determining, in the controller of the transmitter, a third sequence for the preamble, based at least in part on the range and the group identifier; and
forming a third portion of the preamble comprising a third plurality of repetitions of the third sequence, comprising performing, on one or more of the third plurality of repetitions of the third portion, at least one operation according to a Recipe of operations, wherein the third sequence is to enable a non-targeted receiver to further filter the packet.

17. The method of claim 12, further comprising:
concatenating the first portion and the second portion; and
digitally processing the concatenated portions comprising edge processing to mitigate out-of-band spectrum emissions (in a frequency domain) and power variations (in a time domain).

18. A system comprising:
a transceiver comprising:
a preamble generator to generate a preamble for a packet comprising the preamble, a header and a data portion, the preamble comprising:
a first field comprising a first sequence that is repeated a first plurality of times, wherein:
a first length of the first sequence and a number of the first plurality of times are based on a range parameter associated with a range capability between the system and a receiver; and
the first sequence comprises a first slope and a first bandwidth dependent at least in part on a group parameter of a network comprising the system and the receiver; and
a second field comprising a second sequence that is repeated a second plurality of times to provide phase continuity, wherein:
the second sequence comprises a second slope, the preamble generator to apply a Recipe of operations to at least some of the second plurality of times of the second sequence, the Recipe of operations dependent at least in part on the group parameter;
a radio frequency (RF) front end circuit to form a RF signal comprising the preamble, the header and the data portion, the RF front end circuit to transmit the RF signal; and
a non-volatile memory to store at least the first sequence.

19. The system of claim 18, wherein the preamble generator is to generate:
the first field comprising the first sequence comprising a first linear sweep that is repeated the first plurality of times; and
the second field comprising the second sequence comprising a second linear sweep that is repeated the second plurality of times to provide phase and frequency continuity.

20. The system of claim 18, wherein the preamble generator is to generate:
the first field comprising the first sequence comprising a first linear sweep that is repeated the first plurality of times, the preamble generator to apply a first Recipe of operations to at least some of the first plurality of times of the first sequence to provide phase and frequency continuity; and
the second field comprising the second sequence comprising a second linear sweep that is repeated the second plurality of times to provide phase and frequency continuity, wherein at least the second field is to enable multi-user and interference scaling and mitigation.

* * * * *